United States Patent [19]

Briggs et al.

[11] Patent Number: 5,596,950
[45] Date of Patent: Jan. 28, 1997

[54] POULTRY TRANSPORT COMPARTMENT WITH INWARDLY OPENING DOORS

[75] Inventors: Douglas V. Briggs; George C. Stevens, both of Northwood, N.H.

[73] Assignee: American Calan, Inc., Northwood, N.H.

[21] Appl. No.: 285,997

[22] Filed: Aug. 4, 1994

[51] Int. Cl.⁶ .................................................. A01K 31/07
[52] U.S. Cl. ............................................................ 119/489
[58] Field of Search ................................. 119/15, 17, 19, 119/713, 843, 844

[56] References Cited

U.S. PATENT DOCUMENTS

| | | | |
|---|---|---|---|
| 611,753 | 10/1898 | Hoskins | 119/17 |
| 2,159,451 | 5/1939 | Richards | 229/27 |
| 2,601,197 | 6/1952 | Wilson | 119/17 X |
| 3,014,608 | 12/1961 | Aylor | 217/36 |
| 3,095,992 | 7/1963 | Shreckhise | 119/19 X |
| 3,895,727 | 7/1975 | Rucker | 119/17 X |
| 3,942,476 | 3/1976 | Napier | 119/843 X |
| 3,990,400 | 11/1976 | Shreckhise | 119/19 |
| 3,993,026 | 11/1976 | Shreckhise | 119/19 |

OTHER PUBLICATIONS

KenTech Plastics, Inc.'s "Standard and Half–Door Coops" brochure dated Jan. 1993, 1 pg.
Bright Coop Co.'s "Easyload on the Farm" brochure (c. 1992), 2-pgs.
Anglia Autoflow Ltd.'s "Easyload" brochure, (c. 1992), 8 pgs.
American Standard's "Mk II Module Details" brochure (c. 1992).

*Primary Examiner*—Robert P. Swiatek
*Attorney, Agent, or Firm*—Senninger, Powers, Leavitt & Roedel

[57] ABSTRACT

A poultry container comprises a frame assembly defining an interior space, and at least one loading door having one end pivotally mounted on the frame assembly of the poultry container. The frame assembly has an opening accessing the interior space to enable the loading of poultry into the poultry container. The door is mounted on the frame assembly to situate the door in the access opening. The loading door is operable to pivot between an open position in which a free end of the door is positioned in the interior space and a closed position in which the door substantially blocks the access opening of the poultry container. The poultry container further includes a mechanism for biasing the loading door in the closed position. A mechanism restricts the free end of the loading door from swinging outwardly away from the poultry container. Upon actuation of the door by an external force directed to the interior space of the poultry container, the loading door pivots inwardly to the open position to enable the loading of poultry into the container. Upon removal of the external force, the door is urged to the closed position by a spring.

20 Claims, 2 Drawing Sheets

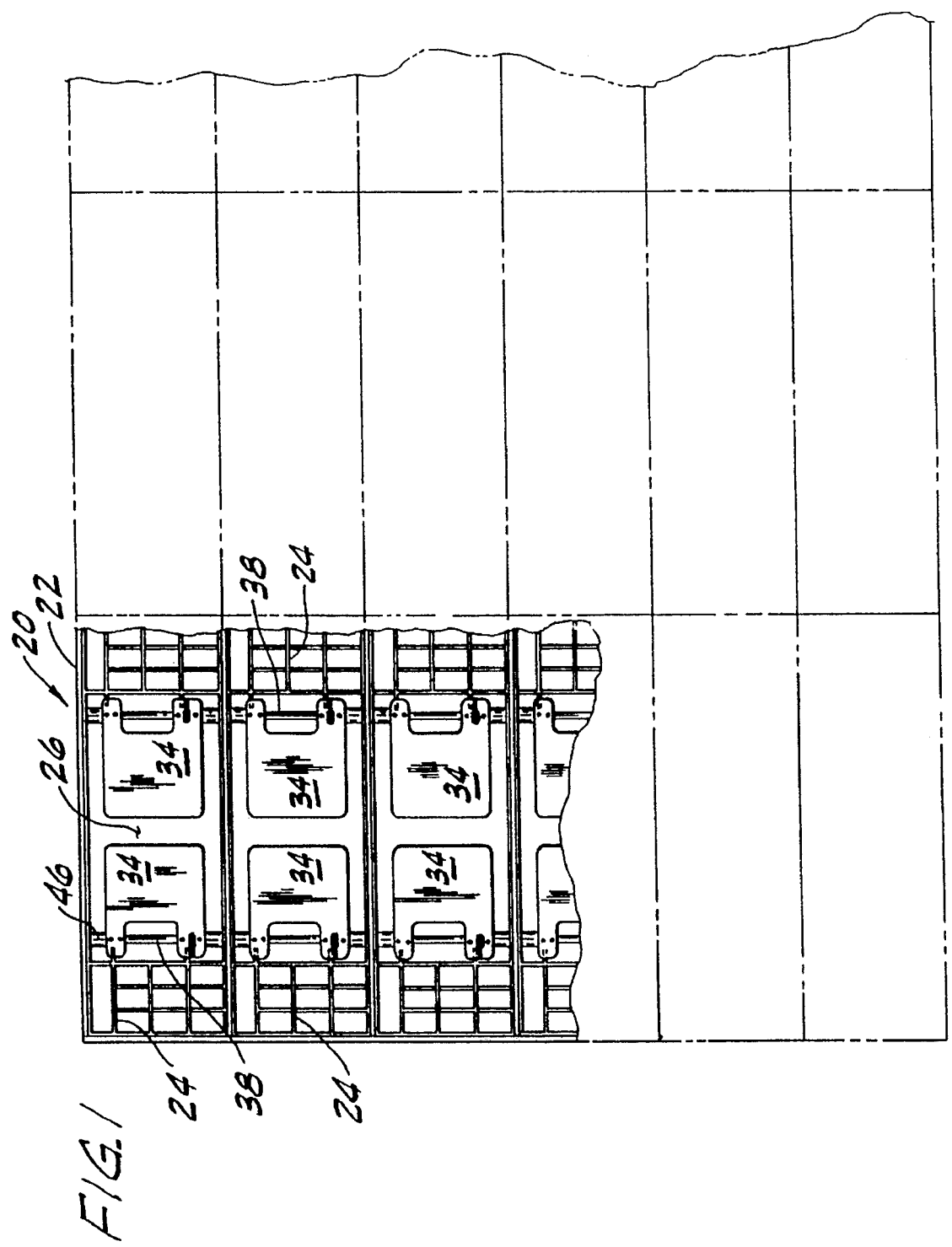

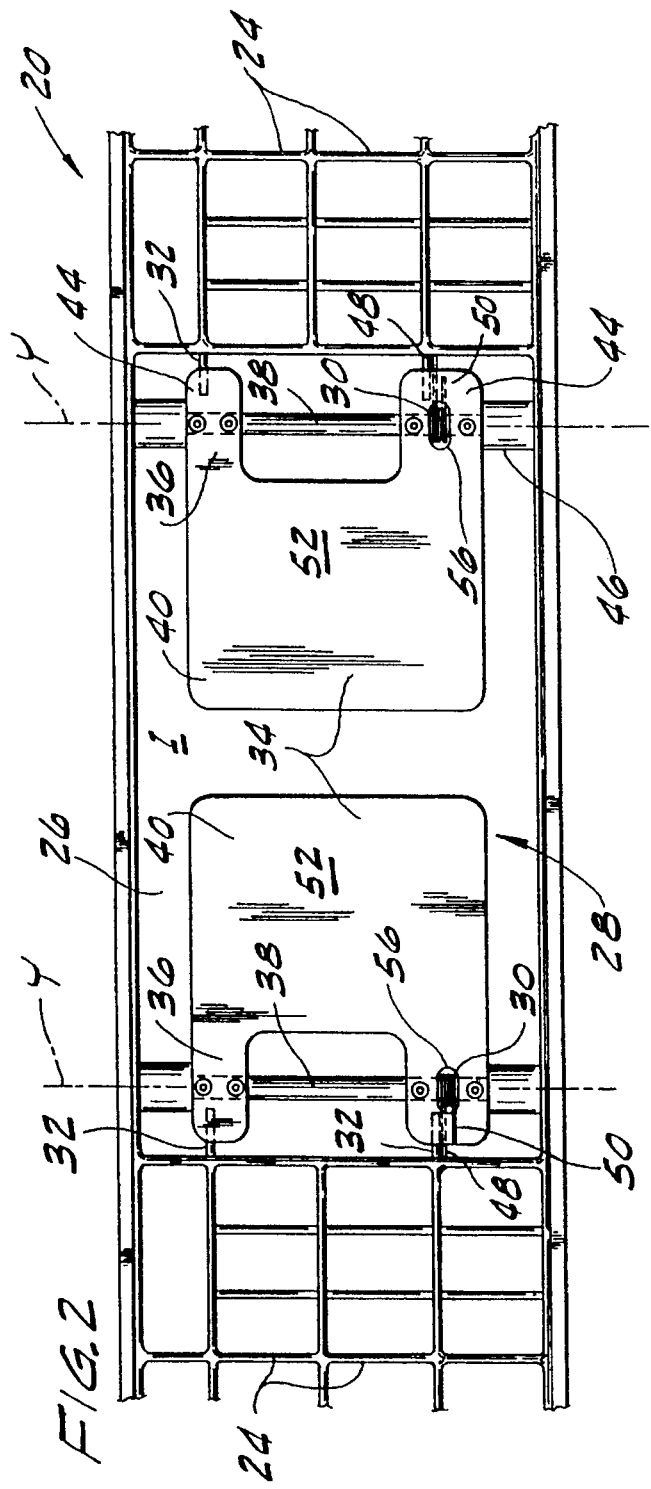
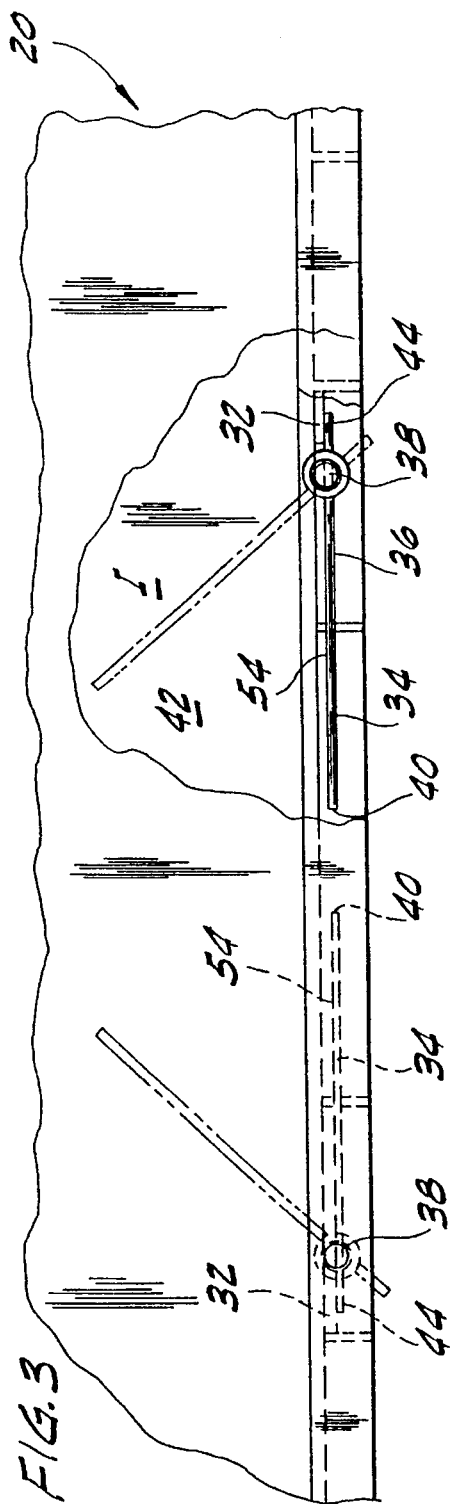

POULTRY TRANSPORT COMPARTMENT WITH INWARDLY OPENING DOORS

BACKGROUND OF THE INVENTION

This invention relates generally to poultry crates and, more particularly, to poultry crates having loading gates which only swing inwardly inside the poultry crate.

It is conventional practice to provide a door or gate in a container for storing poultry. These doors typically pivot outwardly from the container and are provided at the top or side of the container to enable the loading of poultry therein. These prior poultry crate doors are designed to be readily opened by manually swinging the door outwardly of the container. The doors remain in the open position during loading until they are closed by hand or due to a spring biasing the door about its hinge to a closed position. Although these doors serve their intended purpose, they are primarily designed for manual loading of chickens therein. Further, in the open position, the attendant must be efficient in the loading of poultry to prevent escape of the loaded poultry from the container.

SUMMARY OF THE INVENTION

Among the several objects and features of the present invention may be noted the provision of a loading gate which opens inwardly within the container; the provision of such a loading gate which is spring biased to be closed; the provision of such a loading gate which greatly reduces the escape of poultry during loading of further poultry; the provision of such a loading gate which is restricted from pivoting outwardly of the container; and the provision of such a loading gate which is designed for use with a poultry harvester.

Generally, a poultry container of the present invention comprises a frame assembly defining an interior space and having an opening therein for accessing the interior space to enable the loading of poultry into the poultry container, and at least one loading door having one end pivotally mounted on the frame assembly of the poultry container to situate the door in the access opening. The loading door is operable to pivot between an open position in which a free end of the door is positioned in the interior space and a closed position in which the door substantially blocks the access opening of the poultry container. The poultry container further comprises means for biasing the loading door in the closed position, and means for restricting the free end of the loading door from swinging outwardly away from the poultry container. Thus, upon actuation of the loading door by an external force directed to the interior space of the poultry container, the loading door pivots inwardly to the open position to enable the loading of poultry into the container, and upon removal of the external force, the door is urged to the closed position by the biasing means.

Other objects and features will be in part apparent and in part pointed out hereinafter.

BRIEF DESCRIPTION OF THE DRAWINGS

FIG. 1 is a side elevational view of a chicken crate of the present invention;

FIG. 2 is a fragmentary view of a loading gate of a compartment of the chicken crate; and FIG. 3 is a fragmentary top view taken along line 3—3 of FIG. 2 showing doors of the loading gate in an open position in phantom;

Corresponding reference characters indicate corresponding parts throughout the several views of the drawings.

DETAILED DESCRIPTION OF THE PREFERRED EMBODIMENT

Referring now to the drawings, a poultry transport compartment of the present invention is indicated generally at 20. Typically, a poultry crate 22 (FIG. 1) includes fifteen or eighteen compartments 20 arranged in rows and columns such that there are three compartments in a row (i.e., in side-by-side relation) and five or six tiers in each column (i.e., top-to-bottom relation). As shown in FIG. 2, each poultry compartment 20 comprises a frame assembly 24 defining an interior space I and having an access opening 26 therein for enabling the loading of poultry into the interior space, and a loading gate indicated generally at 28 mounted on the frame assembly to situate the gate in the access opening. Each compartment 20 further includes springs 30 engaging both the frame assembly 24 and the loading gate 28 for biasing the loading gate in a closed position and door stops 32 for restricting the loading gate from swinging outwardly away from the poultry compartment 20.

The frame assembly 24 of each compartment 20 is preferably constructed from a grated material—such as expanded metal or fencing material—to provide ventilation for the poultry. The frame assemblies 24 of the compartments 20 are constructed so that adjacent compartments share a common interior wall. The openings 26 formed in the frame assembly 24 of each compartment 20 are sized to enable the loading of poultry therethrough into the poultry compartment. Preferably, the openings 26 corresponding to each compartment 20 of the crate 22 are formed in one side of the frame assembly and are aligned horizontally and vertically (FIG. 1). A loading gate 28 is provided for each access opening 26 of the poultry crate. In the preferred embodiment illustrated, each loading gate 28 comprises two opposed loading doors, each indicated at 34. Each door has one end 36 attached to a pivot rod 38 pivotally mounted on the frame assembly 24 of the poultry compartment 20 and a free end 40. Mounting the door 34 on the pivot rod 38 enables the door to rotate relative to the frame assembly 24 about a pivot axis Y. The doors 34 pivot between a closed position in which the doors substantially block the access opening 26 and an open position in which the doors pivot away relative to each other such that the free end 40 of each door is positioned in the interior space I of the corresponding compartment 20 to define an entryway 42 for the loading of poultry. The doors 34 are preferably constructed from a lightweight, rigid plastic material.

The pivot rod 38 is mounted adjacent to (but spaced from) the frame assembly 24 in the access opening 26. Each door 34 is attached to the pivot rod 38 by rivets or other suitable fastening means in such a manner that a protruding portion 44 of the door 34 extends past the pivot rod towards the frame assembly 24. As illustrated in FIG. 2, the portion 44 of the door 34 extending past the pivot rod 38 may be non-continuous (i.e., the portion may include separated segments of the door). The pivot rod 38 supports the door 34 in the center of the access opening 26 through the use of spacers, each indicated at 46. It will be understood that each door 34 could be attached to a hinge mounted on the frame assembly 24 for pivoting motion relative to the frame assembly without departing from the scope of the present invention. It will be further understood that the loading gate 28 could have only one door 34 closing the access opening 26 of the compartment 20 in the closed position without departing from the scope of the present invention.

Springs 30 mounted on the pivot rods 38 of the loading gate 28 bias the doors 34 of the gate to the closed position. Preferably, each pivot rod 38 is furnished a standard torsion spring 30 having two arms, one arm 48 engaging the frame assembly 24 adjacent the pivot rod and the other arm 50 engaging the loading door 34. As biased in the closed position, each loading door 34 has an outer surface 52 and an inner surface 54 facing the interior space I of the compartment 20. Each door 34 further includes an aperture 56 positioned along the pivot axis Y of the door. The frame-engaging arm 48 of the spring 30 engages the frame assembly 24 on a side of the frame facing the interior space I of the compartment 20. The door-engaging arm 50 of each torsion spring 30 extends through the aperture 56 of its corresponding door 34 to engage the outer surface 52 of the protruding portion 44 of the corresponding loading door. The springs 30 corresponding to each door 34 comprise the biasing means for biasing the loading gate 28 in the closed position. It will be understood that other types of springs 30 and other biasing means—such as magnetic force, servomotors—may be used without departing from the scope of the invention.

The free end 40 of each door 34 of the loading gate 28 is further restricted from pivoting outwardly beyond the periphery of the frame assembly 24 of the poultry compartment 20 by a door stop 32. As shown in FIG. 2, each door 34 has at least one corresponding door stop 32 preferably mounted on the frame assembly 24 in a position adjacent to the pivot rod 38. The door stop 32 extends into the access opening 26 a sufficient distance so that the inner surface 54 of the protruding portion 44 of the door 34 engages the door stop 32 and is prevented from pivoting to the interior I of the compartment 20. So constructed, the free end 40 of each loading door 34 is restricted from pivoting outwardly beyond the frame assembly 24 of the poultry compartment 20. As illustrated in FIG. 2, the door stop 32 preferably comprises a member of the frame assembly 24 adjacent the pivot rod 38 which extends into the access opening 26. As shown, the door stop 32 may include more than one member of the frame assembly 24, the members being separated. The door stops 32 comprise means for restricting the free end 44 of the door 34 from swinging outwardly away from the compartment 20 of the poultry crate 22.

In operation, poultry is either manually captured or a poultry harvester (such as disclosed in co-assigned U.S. Pat. No. 5,325,820, incorporated herein by reference) is used to capture the poultry. The poultry is then loaded into each compartment 20 of the chicken crate or container 22 for transportation to the processing plant for slaughter. To load poultry into each compartment 20, the loading gate 28 of the compartment is pivoted to the open position by directing an external force (preferably, a blast of air) toward the interior space I of the compartment being loaded and at the outer surface 52 of each door 34. Upon pivoting each door 34 to the open position, the torsion spring 30 of each respective door is deflected from its relaxed position. The doors 34 remain in the open position as long as the external force is continuously applied to the doors. It will be understood that the external force to open the doors can also be a mechanical force or the force of chickens being hurled against and through the door 34 into the compartment 20 by a harvester or being pushed into the compartment manually without departing from the scope of the present invention. Upon actuation by such a force, the loading gate 28 pivots inwardly to the open position and thereby enables the loading of poultry into the compartment of the poultry cage through the entryway 42. Upon removal of the external force, the springs 30 recoil to their relaxed position. Thus, the springs 30 urge the door 34 to the closed position by the frame-engaging arms 48 snaring the frame assembly 24 adjacent the pivot rod 38 and the door-engaging arms 50 urging the protruding portions 44 of the door 34 to return to its former position. As such each door 34 is urged to the closed position by its respective torsion spring 30. The door stops 32 prevent the doors 34 from swinging outwardly away from the frame assembly 24 of the compartment 20 and thus secure the poultry within the compartment. A dump gate (not shown) at the opposite side of the compartment 20 is sometimes used to remove the poultry from the compartment for further processing.

It will be understood that a variety of different materials and configurations may be used for the loading gate 28 of this invention depending on the size of the compartment 20, the size of the poultry, and other parameters.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A poultry container comprising
   a frame assembly defining an interior space, the frame assembly having an opening accessing the interior space to enable the loading of poultry into the poultry container,
   two loading doors, each having an end pivotally mounted on the frame assembly of the poultry container to situate the loading door in the opening accessing the interior space, the loading doors being operable to pivot between an open position in which a free end of the door is positioned in the interior space and a closed position in which the loading doors substantially block the opening accessing the interior space of the poultry container,
   means for biasing each of the loading doors in the closed position, and
   means for restricting the free end of each of the loading doors from swinging outwardly away from the poultry container, whereby upon actuation of the loading doors by an external force directed to the interior space of the poultry container the loading doors pivot inwardly to the open position to define an entryway for the loading of poultry into the container and upon removal of the external force the loading doors are urged to the closed position by the biasing means.

2. A poultry container as set forth in claim 1 wherein the loading doors are mounted opposed to each other on the frame assembly such that in the open position the doors pivot away relative to each other to define the entryway for the loading of poultry.

3. A poultry container as set forth in claim 1 further comprising two pivot rods mounted on the frame assembly, each pivot rod mounting one of the loading doors in the opening accessing the interior space for pivoting motion relative to the frame assembly.

4. A poultry container as set forth in claim 1 further comprising two hinges mounted on the frame assembly, each hinge mounting one of the loading doors in the opening accessing the interior space for pivoting motion relative to the frame assembly.

5. A poultry container as set forth in claim 1 wherein the opening accessing the interior space is in a side of the frame assembly and wherein said restricting means comprises at least one door stop, each of the loading doors engaging at least one door stop to restrict the free end of the door from pivoting outwardly beyond the frame assembly of the poultry container.

6. A poultry container as set forth in claim 1 wherein the biasing means comprises a spring, one end of the spring engaging the frame assembly of the poultry container and an opposite end of the spring engaging the at least one loading door.

7. A poultry container as set forth in claim 6 wherein the at least one pivot rod mounts the at least one door in said access opening for pivoting motion relative to the frame assembly, and wherein the spring is a torsion spring having two arms, one arm engaging the frame assembly adjacent said at least one pivot rod and the other arm engaging the at least one loading door whereby upon pivoting the at least one loading door to said open position the spring is deflected from its relaxed position and urges the at least one loading door to said closed position.

8. A poultry container comprising
   a frame assembly defining an interior space, the frame assembly having an opening accessing the interior space in a side of the frame assembly to enable the loading of poultry into the poultry container,
   at least one loading door,
   at least one pivot rod mounted on the frame assembly, the at least one pivot rod mounting the at least one loading door in the access opening for pivoting motion relative to the frame assembly and wherein a protruding portion of the at least one loading door extends past the at least one pivot rod mounting the at least one loading door on the frame assembly towards the frame assembly adjacent the at least one pivot rod,
   at least one door stop being mounted on a portion of the frame assembly adjacent said at least one pivot rod, the protruding portion of the at least one door engaging the at least one door stop to restrict the free end of the at least one door from pivoting outwardly beyond the frame assembly of the poultry container
   wherein the at least one loading door has an end pivotally mounted on the frame assembly of the poultry container to situate the at least one loading door in the opening accessing the interior space, at least one loading door being operable to pivot between an open position in which a free end of the at least one loading door is positioned in the interior space and a closed position in which the at least one loading door substantially blocks the opening accessing the interior space of the poultry container,
   means for biasing the at least one loading door in the closed position, and
   whereby upon actuation of the at least one loading door by an external force directed to the interior space of the poultry container the at least one loading door pivots inwardly to the open position to define an entryway for the loading of poultry into the container and upon removal of the external force the at least one loading door is urged to the closed position by the biasing means.

9. A poultry container as set forth in claim 8 wherein the at least one door stop comprises a member of said frame assembly adjacent the at least one pivot rod extending into the access opening to engage the protruding portion of the at least one loading door in the closed position.

10. A poultry container comprising
    a frame assembly defining an interior space, the frame assembly having an opening accessing the interior space to enable the loading of poultry into the poultry container,
    at least one loading door,
    at least one pivot rod mounted on the frame assembly, said at least one pivot rod mounting said at least one loading door in the access opening for pivoting motion relative to the frame assembly and wherein a protruding portion of said at least one loading door extends past the at least one pivot rod mounting the at least one loading door on the frame assembly towards the frame assembly adjacent the at least one pivot rod,
    wherein the at least one loading door is mounted on the frame assembly of the poultry container to situate at least one the loading door in the access opening, the at least one loading door being operable to pivot between an open position in which a free end of each of the at least one loading door is positioned in the interior space and a closed position in which the at least one loading door substantially block the access opening of the poultry container,
    at least one torsion spring, the at least one torsion spring having two arms, one arm engaging the frame assembly adjacent said at least one pivot rod and the other arm of the at least one torsion spring engaging the protruding portion of the at least one loading door for biasing the at least one loading door in the closed position, and
    means for restricting the free end of the at least one loading door from swinging outwardly away from the poultry container, whereby upon actuation of the at least one loading door by an external force directed to the interior space of the poultry container the at least one loading door pivots inwardly to the open position to define an entryway for the loading of poultry into the container and upon removal of the external force the at least one loading door is urged to the closed position by the biasing means.

11. A poultry container as set forth in claim 10 wherein the at least one loading door has an outer surface and an inner surface facing the interior space of the poultry container when the at least one loading door is in the closed position, and wherein the at least one loading door further comprises an aperture, the frame-engaging arm of the torsion spring engaging the frame assembly on a side of the frame facing the interior space of the container and the door-engaging arm of the torsion spring extending through the aperture to engage the outer surface of the at least one loading door.

12. A poultry container as set forth in claim 11 wherein the at least one loading door pivots about a pivot axis and wherein the aperture is positioned along the pivot axis of the at least one loading door.

13. A loading gate for a compartment of a poultry crate, the compartment having a frame assembly defining an interior space and an access opening in the frame assembly for accessing the interior space of the compartment for loading poultry therein, the loading gate comprising,
    two loading doors,
    mounting means to pivotally mount each loading door on the frame assembly of the compartment to situate the loading doors in the access opening, the mounting means enabling the loading doors to pivot between an open position in which a free end of each of the loading doors is positioned in the interior space of the frame assembly to define an entryway for the loading of poultry, and a closed position in which the loading doors substantially block the access opening of the compartment, means for biasing the loading doors in the closed position, and means for restricting the free end of each loading door from swinging outwardly away from the compartment of the poultry crate, whereby upon actuation of the loading doors by an external force directed to the interior space of the compartment the loading doors pivot inwardly to the open position to enable the loading of poultry into the compartment of the poultry crate and upon removal of the external force the loading doors are urged to the closed position by the biasing means.

14. A loading gate for a compartment of a poultry crate as set forth in claim 13 wherein the two loading doors are mounted opposed on the frame assembly by the mounting means such that in the open position the free end of the doors pivot away relative to each other to define the entryway for the loading of poultry.

15. A loading gate for a compartment of a poultry crate as set forth in claim 14 wherein the mounting means comprises two pivot rods mounted on the frame assembly, each pivot rod mounting a loading door in the access opening for pivoting motion relative to the frame assembly.

16. A loading gate for a compartment of a poultry crate as set forth in claim 15 wherein the access opening is in a side of the frame assembly of the compartment and wherein the restricting means comprises a door stop, the loading door engaging the door stop to restrict the free end of the loading door from pivoting outwardly beyond the frame assembly of the compartment.

17. A loading gate for a compartment of a poultry crate as set forth in claim 15 wherein the biasing means comprises a torsion spring having two arms mounted on each pivot rod, each spring having one arm engaging the frame assembly adjacent the pivot rod and the other arm engaging the loading door whereby upon pivoting the loading door to the open position the spring is deflected from its relaxed position and urges the loading door to the closed position.

18. A poultry crate having at least one row of compartments in side-by-side relation, each row having at least two compartments, and having at least one column of compartments in top-to-bottom relation, each column having at least two compartments, the poultry crate comprising a frame assembly defining the compartments such that each compartment has an interior space, the frame assembly having openings in a side of the frame assembly for accessing the interior space of each compartment from outside the frame assembly to enable the loading of poultry into each compartment, two loading doors for the opening accessing the interior space of each compartment, each loading door having one end pivotally mounted on the frame assembly of the poultry crate to situate the loading doors in the opening accessing the interior space of the compartment, each loading door being operable to pivot between an open position in which a free end of each loading door is positioned in the interior space of the compartment and a closed position in which the loading doors substantially block the opening of the compartment, means for biasing each loading door in the closed position, and means for restricting the free end of each loading door from swinging outwardly away from the poultry crate, whereby upon actuation of the loading doors by an external force directed to the interior space of its corresponding compartment the loading doors pivot inwardly to the open position to enable the loading of poultry into the crate and upon removal of the external force the loading doors are urged to the closed position by the biasing means.

19. The poultry crate as set forth in claim 18 wherein the frame assembly includes interior walls to define separate compartments, adjacent compartments having a common interior wall.

20. A poultry container as set forth in claim 18 wherein the loading doors for accessing the interior space of each compartment are mounted opposed on the frame assembly such that in the closed position the loading doors substantially block the opening accessing the interior space and in the open position the loading doors pivot away relative to each other to define an entryway for the loading of poultry.

* * * * *